United States Patent [19]

Snider et al.

[11] Patent Number: 5,064,873

[45] Date of Patent: Nov. 12, 1991

[54] RIGID FOAM WITH IMPROVED "K" FACTOR BY REACTING A POLYISOCYANATE PREPOLYMER AND POLYESTER POLYOL CONTAINING LOW FREE GLYCOL

[75] Inventors: Scott C. Snider, St. Petersburg; Michael E. Londrigan, Clearwater; Kenneth G. Trout, Tampa, all of Fla.

[73] Assignee: Jim Walter Research Corp., St. Petersburg, Fla.

[21] Appl. No.: 342,508

[22] Filed: Apr. 24, 1989

[51] Int. Cl.$^5$ ............................................. C08G 18/14
[52] U.S. Cl. ...................................... 521/131; 521/99; 521/159; 521/172; 521/902; 428/308.4; 428/423.1
[58] Field of Search ................. 521/159, 172, 902, 99, 521/131; 428/308.4, 423.1

[56] References Cited

U.S. PATENT DOCUMENTS

| | | | |
|---|---|---|---|
| 4,237,238 | 12/1980 | DeGuiseppi et al. | 521/131 |
| 4,346,229 | 8/1982 | Derr et al. | 560/91 |
| 4,411,949 | 10/1983 | Snider et al. | 428/304.4 |
| 4,417,001 | 11/1983 | Svoboda et al. | 521/114 |
| 4,439,550 | 3/1984 | Brennan | 521/131 |
| 4,469,824 | 9/1984 | Grigsby, Jr. et al. | 521/173 |
| 4,521,611 | 6/1985 | Magnus | 560/91 |
| 4,526,908 | 7/1985 | Magnus et al. | 521/172 |
| 4,636,530 | 1/1987 | Narayan | 521/159 |
| 4,714,717 | 12/1987 | Londrigan et al. | 521/131 |
| 4,720,571 | 1/1988 | Trowell | 560/91 |
| 4,758,607 | 7/1988 | Hallmark et al. | 521/172 |
| 4,791,148 | 12/1988 | Riley et al. | 521/159 |

*Primary Examiner*—Maurice J. Welsh
*Attorney, Agent, or Firm*—C. W. Vanecek

[57] ABSTRACT

Rigid cellular polymers are made by reacting an isocyanate-terminated quasi-prepolymer with a polyol component comprising a polyester polyol having a free glycol content of less than about 7 percent by weight of the polyester polyol in the presence of a blowing agent. The combined use of the quasi-prepolymer and the polyester polyol enhances the thermal insulating properties of the foams.

32 Claims, No Drawings

RIGID FOAM WITH IMPROVED "K" FACTOR BY REACTING A POLYISOCYANATE PREPOLYMER AND POLYESTER POLYOL CONTAINING LOW FREE GLYCOL

BACKGROUND OF THE INVENTION

1. Field of the Invention

This invention relates to the preparation of rigid cellular polymer materials, particularly polyisocyanurate and polyurethane foams, characterized by improved insulating properties. More particularly, the invention relates to an improvement in the foam's insulating capacity by reacting a polyisocyanate prepolymer and polyester polyol containing low free glycol.

2. Description of the Prior Art

The preparation of foams characterized by isocyanurate and urethane linkages is well known in the art. Generally, these foams are prepared by reacting an organic polyisocyanate with a polyol in the presence of a blowing agent and a catalyst(s). Polyester polyols of many types can be used as the polyol components in the production of these foams.

Because of the relatively high cost of various typical polyols useful in making cellular polymers and because an inexpensive source of polyols is now available from such sources as crude dimethyl terephthalate oxidate residues, recycled poly (ethylene terephthalates), and various other scrap polyester sources, efforts have heretofore been directed to processes for converting these materials to commercially useful polyester polyols. These efforts have led to a number of polyester polyols found to be highly suitable in producing foams of good quality. However, there is still a search for improvements in these polyols and the ways of using them in foam manufacture.

It is also known that polyols, including certain aromatic polyester polyols, can be reacted with isocyanates to form isocyanate-terminated quasi-prepolymers which in turn can be used in the formation of polyurethane and/or polyisocyanurate foams, as disclosed, e.g., in U.S. Pat. No. 4,791,148.

A most important characteristic of rigid foams is their insulating value which is expressed by the k- and aged k- factor. The k-factor is a measurement of the insulating properties (thermoconductivity) and the aged k-factor indicates insulating properties over time. Foams prepared from the above-noted quasi-prepolymers of U.S. Pat. No. 4,791,148 exhibit low initial thermal conductivity values and maintain low thermal conductivity values after prolonged periods of use. It would be most beneficial to provide still further improved formulations for the production of rigid foams having a combination of advantageous properties, including especially good insulating properties, as reflected in low initial thermal conductivity values and low thermal conductivity values after prolonged periods of use.

OBJECTS OF THE INVENTION

It is accordingly an object of the present invention to provide improved rigid plastic foams, especially polyisocyanurate and polyurethane foams, having a combination of advantageous properties, including excellent thermal insulative properties, reduced friability, and good dimensional stability, thermal resistance, and compressive strength, and an improved method of producing the foams.

It is another object of the present invention to provide closed cell foam materials which can be used in building panels which are highly insulating, thermally resistant, low in friability, and soundproof.

It is a further object of the present invention to provide a polyester polyol-containing composition for use in the preparation of rigid plastic foams having a combination of advantageous properties, especially an improved insulating efficiency.

DESCRIPTION OF THE INVENTION

The above objects have been achieved by the combined use of a polyisocyanate prepolymer and a polyester polyol composition containing a low free glycol content for the formation of rigid plastic foams having improved insulating properties. While the polyisocyanate prepolymer and low free glycol-containing polyester polyol compositions individually contribute to the formation of low k-factor foams, it has now been surprisingly discovered that their combined use results in the production of foams having lower k-factors than foams made with either composition alone.

The polyisocyanate prepolymers (quasi-prepolymers) may be prepared by reacting an excess of an organic polyisocyanate or a mixture of polyisocyanates with a minor amount of at least one active hydrogen containing compound. The low free glycol-containing polyester polyol compositions of the invention may be prepared by reacting a polycarboxylic acid and/or acid derivative with a polyol component comprising at least one glycol compound. The improved foams of the invention advantageously comprise polyisocyanurate and polyurethane foams prepared by reacting together the isocyanate-terminated quasi-prepolymer and the low free glycol-containing polyester polyol composition, and optionally other polyhydroxyl compounds in the presence of a blowing agent(s). The reaction may be carried out in the presence of catalysts, auxiliaries and additives as required (e.g., a surfactant).

The isocyanate-terminated quasi-prepolymers of the invention are prepared by reacting together one or more organic isocyanates with an organic compound having at least two active hydrogen atoms as determined by the well-known Zerewitinoff test, as described by Kohler in Journal of the American Chemical Society, 40, 318 (1927). The reaction takes advantage of the reactivity of the isocyanate groups and builds up multiple molecular units of higher molecular weight. Chain building compounds containing active hydrogen atoms which are particularly useful are polyester and polyether polyols, especially polyester polyols and mixtures of polyester and polyether polyols. The chain builders are used in predetermined amount sufficient to produce reactive polyisocyanate prepolymers of the desired equivalent weight (e.g., 140 to 250) and significant excess isocyanate functionality. Generally, the quasi-prepolymers have a free isocyanate content of from 16.8% to 30.0%, preferably 24.0% to 29.0%, by weight.

The preparation of the quasi-prepolymer may be exemplified with reference to that derived from a polyester polyol. The preparation is accomplished simply by reacting the isocyanate and polyester polyol in a suitable reaction vessel, generally in an inert (nitrogen) atmosphere. The isocyanate is preferably heated to approximately 50° to 100° C. before addition of polyester polyol, which is added gradually with stirring over a period of time generally between 15 minutes and several hours. A modest exotherm is allowed to develop and the temperature is increased to approximately 90° C. and held there until the desired NCO content is reached, after which the product is discharged.

The quantity of polyester polyol which is reacted with the isocyanate may vary, but generally is not less than 2 percent and not more than 30 percent relative to the weight of the final quasi-prepolymer, and preferably 20 percent or less. The stoichiometry must be such that sufficient equivalents of isocyanate are present to insure that the finished quasi-prepolymer will be isocyanate-terminated, as is well known to those skilled in the art. Examples of analogous formulations and their stoichiometrics may be found in POLYURETHANES: CHEMISTRY AND TECHNOLOGY, volumes I and II, by Saunders and Frisch, published by Wiley-Interscience. Catalysis is generally not required to form the quasi-prepolymers, and it is undesirable to include non-removable catalysts whose residual catalytic effect would cause further polymerization leading to undesirable increases in viscosity during storage. However, catalysts which do not promote the reaction of isocyanate groups with each other may be used, especially when the quasi-prepolymer is to be foamed within a short time.

Catalysts suitable for the preparation of the isocyanate-terminated prepolymers are, for example, the various alkyl tin carboxylates and tin carboxylates. Preferably used when catalysis is desired, for example, are tin-(II) octoate, and dibutyl tin dilaurate. When catalysts are used, they may be present in amounts at from 0.005 to 2 percent by weight, preferably from 0.01 to 0.1 percent by weight. As indicated previously, preferably no catalyst is utilized.

The organic isocyanates to be reacted with the chain builders have a functionality of two or higher. For example, organic diisocyanates, polyisocyanates, or mixtures thereof may be used successfully. The organic isocyanates may be aliphatic, cycloaliphatic, alicyclic, aromatic or aromatic aliphatic isocyanates. The various isocyanates suitable for the preparation of the quasi-prepolymers of the invention are well known to those skilled in the art.

Among the many isocyanates suitable for the practice of the subject invention are, for example, aliphatic isocyanates such as tetramethylene, hexamethylene, octamethylene and decamethylene diisocyanates, and their alkyl substituted homologs; cycloaliphatic isocyanates such as 1,2-, 1,3- and 1,4-cyclohexane diisocyanates, 2,4- and 2,6-methylcyclohexane diisocyanates, 4,4'- and 2,4'-dicyclohexyldiisocyanates, 4,4'- and 2,4'-dicyclohexylmethane diisocyanates, 1,3,5-cyclohexane triisocyanates, and saturated (hydrogenated) polymethylenepolyphenylenepolyisocyanates; alicyclic isocyanates such as isocyanatomethylcyclohexane isocyanates, isocyanatoethylcyclohexane isocyanates, bis-(isocyanatomethyl)cyclohexane diisocyanates, 4,4'- and 2,4'-bis(isocyanatomethyl) dicyclohexane, and isophorone diisocyanate; aromatic isocyanates such as 1,2-, 1,3-, and 1,4-phenylene diisocyanates, 2,4- and 2,6-toluene diisocyanate, 2,4'-, 4,4'- and 2,2-biphenyl diisocyanates, 2,2'-, 2,4'- and 4,4'-diphenylmethane diisocyanates, and polymethylenepolyphenylenepolyisocyanates (polymeric MDI); and aromatic aliphatic isocyanates such as 1,2-, 1,3-, and 1,4-xylylene diisocyanates.

Organic isocyanates containing heteroatoms may also be utilized, for example those derived from melamine. Modified polyisocyanates, such as carbodiimide or isocyanurate can also be employed. Liquid carbodiimide group- and/or isocyanurate ring-containing polyisocyanates having isocyanate contents from 15 to 33.6 percent by weight, preferably from 21 to 31 percent by weight, are also effective, for example, those based on 4,4'-, 2,4'-, and/or 2,2'-diphenylmethane diisocyanate and/or 2,4- and/or 2,6-toluene diisocyanate, and preferably 2,4- and 2,6-toluene diisocyanate and the corresponding isomer mixtures, 4,4'-, 2,4', and 2,2'-diphenylmethane diisocyanates as well as the corresponding isomer mixtures, for example, mixtures of 4,4'- and 2,4'-diphenylmethane diisocyanates, mixtures of diphenylmethane diisocyanates and polyphenyl polymethylene polyisocyanates (polymeric MDI), and mixtures of toluene diisocyanates and polymeric MDI. Preferred, however, are the aromatic diisocyanates and polyisocyanates. Particularly preferred are 2,4-, and 2,6-toluene diisocyanate and mixtures thereof (TDI), 2,4'-, 2,2'- and 4,4'-diphenylmethane diisocyanate (MDI), polymethylenepolyphenylenepolyisocyanates (polymeric MDI), and mixtures of the above preferred isocyanates.

Most particularly preferred are the polymeric MDIs.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl-terminated polyesters, polyalkylene polyether polyols, hydroxy-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic, aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group as well as those which contain an amino group and a —SH group.

In a preferred embodiment of the invention, polyester polyols are used as chain builders in producing the isocyanate terminated quasi-prepolymers. However, whether prepared from a polyester polyol or some other chain builder, the quasi-prepolymers are polymerized in the presence of a specific polyol, viz., a polyester polyol having a low free glycol content, to form the inventive polyisocyanurate and/or polyurethane foams which exhibit low initial thermal conductivity values and maintain low thermal conductivity values after prolonged periods of use.

The polyester polyols themselves can be prepared by known procedures from a polycarboxylic acid component comprising a polycarboxylic acid or acid derivative, such as an anhydride or ester of the polycarboxylic acid, and any polyol component, the polyol component comprising a glycol(s) or a glycol-containing mixture of polyols in the production of the low free glycol-containing polyester polyol. The polyacid and/or polyol components may, of course, be used as mixtures of two or more compounds in the preparation of the polyester polyols. Particularly suitable polyester polyols for use in preparing the quasi-prepolymers and for reaction with the quasi-prepolymers in foam production are aromatic polyester polyols containing phthalic acid residues.

The production of the polyester polyols is accomplished by simply reacting the polycarboxylic acid or acid derivative with the polyol component in a known manner until the hydroxyl and acid values of the reaction mixture fall in the desired range. The reaction typically is performed at temperatures from about 150° C. to 250° C. for a period from about 1 to 10 hours. The reaction can be carried out as a batch process or continuously. When present, excess glycol can be distilled from the reaction mixture during and/or after the reaction, such as in the preparation of the low free glycol-containing polyester polyols. Normally, an effective amount of catalyst is added to promote the present reaction. Any conventional esterification or transesterification catalyst (single compound or mixture of compounds) can be used. Suitable catalysts include organo-tin compounds, particularly tin compounds of carboxylic acids, such as stannous octoate, stannous oleate, stannous acetate, stannous laurate, dibutyl tin dilaurate, and other such tin salts. Additional suitable metal catalysts include tetraisopropyl titanate, and other such titanate salts, and the like.

The polycarboxylic acid component may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bisglycol ester.

Polyester polyols whose acid component advantageously comprises at least about 30% by weight of phthalic acid residues are particularly useful. By phthalic acid residue is meant the group

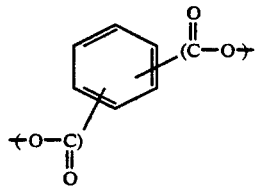

While the aromatic polyester polyols can be prepared from substantially pure reactant materials, more complex ingredients are advantageously used, such as the side-stream, waste or scrap residues from the manufacture of phthalic acid, terephthalic acid, dimethyl terephthalate, polyethylene terephthalate, and the like. Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid and (h) trimellitic anhydride, and (i) combinations thereof. These compositions may be converted by reaction with the polyols of the invention to polyester polyols through conventional transesterification or esterification procedures.

A preferred polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalates, especially polyethylene terephthalate (PET), residues or scraps.

Still other preferred residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of by-products. The desired DMT and the volatile methyl p-toluate by-product are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process, or, if desired, the residue can be processed further, as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Hercules, Inc., Wilmington, Del., sells DMT process residues under the trademark Terate ®101. DMT process residues having a different composition but still containing the aromatic esters and acids are also sold by DuPont and others. The DMT process residues to be transesterified in accordance with the present invention preferably have a functionality at least slightly greater than 2.

Such suitable residues include those disclosed in U.S. Pat. Nos. 3,647,759, 4,411,949, and 4,714,717, the disclosures of which with respect to the residues are hereby incorporated by reference.

The polyester polyols which are used as chain builders in producing the isocyanate terminated quasi-prepolymers may be prepared from the above described polycarboxylic acid components and any polyol component. The polyols can be aliphatic, cycloaliphatic, aromatic and/or heterocyclic. Low molecular weight aliphatic polyhydric alcohols, such as aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. Moreover, the polycarboxylic acid(s) may be condensed with a mixture of polyhydric alcohols and amino alcohols.

Examples of suitable polyhydric alcohols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinitol; mannitol; sorbitol; formitol; α-methyl-glucoside; diethylene glycol; triethylene glycol; tetraethylene glycol and higher polyethylene glycols; dipropylene glycol and higher polypropylene glycols as well as dibutylene glycol and higher polybutylene glycols. Especially suitable polyols are alkylene glycols and oxyalkylene glycols, such as ethylene glycol, diethylene glycol, dipropylene glycol, triethylene glycol, tripropylene glycol, tetraethylene glycol, tetrapropylene glycol, trimethylene glycol and tetramethylene glycol, and 1,4-cyclohexanedimethanol(1,4-bis-hydroxymethylcyclohexane).

The term "polyester polyol" as used in this specification and claims includes any minor amounts of unreacted polyol remaining after the preparation of the polyester polyol and/or unesterified polyol added after the preparation.

These prepolymer-building polyester polyols advantageously have an average functionality of about 1.8 to 8, preferably about 1.8 to 5, and more preferably about 2 to 2.5. Their hydroxyl number values generally fall within a range of about 15 to 750, preferably about 30 to 550, and more preferably about 100 to 550.

The quasi-prepolymer may be produced from commercially available polyester polyols. Examples of such polyester polyols are those derived from PET scrap and available under the designation Chardol 170, 570, 571 and 572 from Chardonol and Freol 30-2150 from Freeman Chemical. Examples of suitable DMT derived polyester polyols are Terate ® 202, 203, and 204 polyols, which are available from Hercules Incorporated. Phthalic anhydride derived-polyester polyols are commercially available under the designation Pluracol ® polyol 9118 from BASF Corporation, and Stepanol PS-2002, PS-2402, PS-2502A, PS-2502, PS-2522, PS-2852, PS-2552, and PS-3152 from Stepan Company. NCO-capped prepolymers prepared from the phthalic anhydride derived polyester polyols, and the foams prepared therefrom constitute preferred embodiments of the present invention.

In the preparation of the foams of the present invention, the quasi-prepolymer is reacted with a low free glycol-containing polyester polyol whose free glycol content is sufficiently low to bring about significant improvement in foam insulation value. Typically, the free glycol content is less than about 7, preferably less than about 6, and more preferably less than about 5, percent by weight of the total polyester polyol composition.

The glycols which are reacted with the above-described polycarboxylic acid components in producing the low free glycol-containing polyester polyols may contain heteroatoms (e.g., thiodiglycol) or may be composed solely of carbon, hydrogen, and oxygen. They are advantageously simple glycols of the general formula $C_nH_{2n}(OH)_2$ or polyglycols distinguished by intervening ether linkages in the hydrocarbon chain, as represented by the general formula $C_nH_{2n}O_x(OH)_2$. In a preferred embodiment of the invention, the glycol is a low molecular weight aliphatic diol of the generic formula:

$$HO-R-OH$$

wherein R is a divalent radical selected from the group consisting of:
(a) alkylene radicals each containing from 2 through 6 carbon atoms, and
(b) radicals of the formula:

$$-(R^1O)_m-R^1-$$

wherein $R^1$ is an alkylene radical containing from 2 through 6 carbon atoms, and m is an integer of from 1 through 4, and
(c) mixtures thereof.

Besides the glycols, any suitable polyhydric alcohol may be used in preparing the free glycol-containing polyester polyols. These additional polyols can be aliphatic, cycloaliphatic, aromatic and/or heterocyclic, and are preferably selected from the group consisting of diols, triols and tetrols. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like, may also be used. These additional polyols are used in amounts which do not detract from the enhanced insulating properties stemming from the low free glycol content of the polyester polyols.

A preferred low free glycol-containing polyester polyol of the invention is prepared by reacting a polycarboxylic acid and/or acid derivative, especially one containing a phthalic acid residue (e.g., phthalic anhydride), with an alkylene glycol having the formula $$HO-(CH_2CHO)_{\overline{z}}H$$
$$\phantom{HO-(CH_2C}\!|$$
$$\phantom{HO-(CH_2CHO)_{\overline{z}}}R^2$$

wherein $R^2$ is hydrogen or lower alkyl of one to four carbon atoms, preferably hydrogen or methyl, and z is from 1 to 5, preferably 1 to 3, and more preferably 1 to 2. Examples of the alkylene glycols are ethylene glycol, propylene glycol, diethylene glycol, dipropylene glycol, triethylene glycol, tetraethylene glycol, tripropylene glycols and tetrapropylene glycol, among others, and mixtures thereof. Especially suitable glycols are ethylene glycol and diethylene glycol.

The properties of the low free glycol-containing polyester polyol of the present invention fall within rather broad ranges. The viscosities (Brookfield) of the polyol measured in cps. at 25° C. fall within a rather broad range from about 500 to about 500,000, preferably about 500 to about 100,000, and most preferably about 2,000 to about 50,000; the hydroxyl number values fall within a range of from about 115 to about 750, preferably about 150 to about 600, and most preferably from about 160 to about 320; and the acid number falls within a range of from about 0.2 to about 40 and preferably about 0.2 to about 10.

Highly preferred low free glycol-containing polyester polyols of the invention are derived from the reaction of phthalic anhydride or phthalic acid with ethylene and/or diethylene glycol, and are characterized by a viscosity in cps at 25° C. of about 8,000 to 35,000, a free glycol content of from about 0 through 5 percent by weight of the polyester polyol, and a hydroxyl number within a range of from about 190 to 240.

The polymer foams of the present invention can be prepared by using standard techniques known to those skilled in the art. In an advantageous embodiment of the invention, the low free glycol-containing polyester polyols are employed in admixture with at least one other polyol in the production of the foams, especially the polyurethane foams. The polyisocyanurate and polyurethane foams can be prepared by mixing together the quasi-prepolymer and the low free glycol-containing polyester polyol, catalyst and blowing agent at temperatures ranging from about 0° C. to 150° C.

The polyisocyanurate or polyurethane foam of the invention particularly comprises the reaction product of an isocyanate group terminated quasi-prepolymer and a polyol component which comprises (a) a polyester polyol having a low free glycol content or (b) a polyol mixture of the low free glycol-containing polyester polyol with at least one other polyol, in the presence of a blowing agent, a catalyst, and auxiliaries and additives as required. The amount of the low free glycol-containing polyester polyol in polyol mixture (b) is advantageously sufficient to reduce the aged k-factor of the resultant foam to below the aged k-factor of the corresponding foam prepared from the same foam-forming composition and having the same index except that the polyol component solely consists of the other polyol or polyols and excludes the low free glycol-containing polyester polyol. Preferably, the polyol component employed in manufacturing the polyisocyanurate or polyurethane foam of the invention comprises (a) a polyester polyol having a free glycol content of less than about 7 percent by weight of the polyester polyol or (b) a mixture of the free glycol-containing polyester polyol with at least one other polyol, the total free glycol content of polyol mixture (b) being less than about 7 percent by weight of the content of polyester polyol in said mixture.

The polyurethane foams can be prepared by reacting the polyol of the invention and quasi-prepolymer on an essentially 1:1 to 1:1.25 equivalent basis. In the embodiment wherein the low free glycol-containing polyester polyols of the invention are combined with another polyol(s) to produce polyurethane foams, the low free glycol-containing polyester polyols of the invention can comprise about 5 to 100, preferably about 20 to 80, and more preferably about 40 to 60, weight percent of the total polyol content in the foam preparations.

The polyisocyanurate foams of the invention are prepared by reacting the quasi-prepolymer with a minor amount of polyol, such as sufficient polyol to provide about 0.10 to 0.70 hydroxyl equivalents of polyol per equivalent of said polyisocyanate prepolymer, wherein the low free glycol-containing polyester polyol of the invention comprises about 5 to 100, and preferably about 50 to 100, weight percent of the total polyol content in the foam preparations.

In order to ensure complete reaction in the production of the polyisocyanurate foams, the quasi-prepolymer and the polyol are generally mixed in an equivalent ratio of 1.5:1 to 12:1 and preferably 2:1 to 10:1. In ranges outside these proportions the reaction tends to yield a product having less desirable physical characteristics.

The polyols which can be employed in combination with the low free glycol-containing polyester polyols of the invention in the preparation of the polyurethane and polyisocyanurate foam compositions include monomeric polyols and polyether polyols in general. The polyether polyols are found particularly useful in preparing rigid polyurethane foams. The polyfunctional active hydrogen initiators used in producing the polyether polyols preferably have a functionality of 2–8, and more preferably have a functionality of 3 or greater (e.g., 4–8).

Any suitable blowing agent can be employed in the foam compositions of the present invention. Water, air, nitrogen, carbon dioxide, readily volatile organic substances and/or compounds which decompose to liberate gases (e.g., azo compounds may be used). Typically, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_2$, $CClFCClF_2$, trifluorochloropropane, difluorodichloromethane, 1-fluoro-1,1-dichloroethane, 1,1-trifluoro-2,2-dichloroethane, 1,1-difluoro-1-chloroethane, methylene chloride, diethylether, isopropyl ether, n-pentane, cyclopentane, 2-methylbutane, methyl formate, carbon dioxide and mixtures thereof. Trichlorofluoromethane is a preferred blowing agent.

The foams also can be produced using a froth-foaming method, such as the one disclosed in U.S. Pat. No. 4,572,865. In this method, the frothing agent can be any material which is inert to the reactive ingredients and easily vaporized at atmospheric pressure. The frothing agent advantageously has an atmospheric boiling point of −50° to 10° C., and includes carbon dioxide, dichlorodifluoromethane, monochlorodifluoromethane, trifluoromethane, monochlorotrifluoromethane, monochloropentafluoroethane, vinylfluoride, vinylidenefluoride, 1,1-difluoroethane, 1,1,1-trichlorodifluoroethane, and the like. Particularly preferred is dichlorodifluoromethane. A higher boiling blowing agent is desirably used in conjunction with the frothing agent. The blowing agent is a gaseous material at the reaction temperature and advantageously has an atmospheric boiling point ranging from about 10° to 80° C. Suitable blowing agents include trichloromonofluoromethane, 1,1,2-trichloro-1,2,2-trifluoroethane, acetone, pentane, and the like, preferably trichloromonofluoromethane.

The foaming agents, e.g., trichlorofluoromethane blowing agent or combined trichlorofluoromethane blowing agent and dichlorodifluoromethane frothing agent, are employed in an amount sufficient to give the resultant foam the desired bulk density which is generally between 0.5 and 10, preferably between 1 and 5, and most preferably between 1.5 and 2.5, pounds per cubic foot. The foaming agents generally comprise from 1 to 30, and preferably comprise from 5 to 20 weight percent of the composition. When a foaming agent has a boiling point at or below ambient, it is maintained under pressure until mixed with the other components. Alternatively, it can be maintained at subambient temperatures until mixed with the other components. Mixtures of foaming agents can be employed.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. Pat. Nos. 4,365,024 and 4,529,745 and supplied by Sloss Industries Corporation under the trademarks Foamstab 100 and 200. Generally, the surfactant comprises from about 0.05 to 10, and preferably from 0.1 to 6, weight percent of the foam-forming composition.

Any of the catalysts conventionally employed in the art to catalyze the reaction of an isocyanate with an isocyanate-reactive compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N,N'-tetramethyl-1,3-butanediamine, N,N-dimethylethanolamine, N,N-diethylethanolamine, and the like. The catalysts generally comprise from about 0.1 to 20, and preferably from 0.3 to 10, weight percent of the total foam-forming composition.

In the preparation of the polyisocyanurate rigid foams, any catalysts known to catalyze the trimerization of isocyanates to form isocyanurates, and to catalyze the reaction of isocyanate groups with hydroxyl groups to form polyurethanes, can be employed. One preferred type of catalyst is a mixture of a tertiary amino phenol, such as 2,4,6-tris(dimethylamino methyl)phenol (sold by Rohm and Haas Co. under the designation "DMP-30"), and an alkali metal carboxylate, such as potassium-2-ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another preferred catalyst system is a mixture comprising (i) a salt of a low molecular weight carboxylic acid selected from the group consisting of an alkali metal salt and an alkaline earth metal salt and mixtures thereof (e.g., potassium acetate), (ii) a salt of a higher molecular weight carboxylic acid selected from the group consisting of an alkali metal salt and an alkaline earth metal salt and mixtures thereof, the higher molecular weight carboxylic acid having from about 5 to 30 carbon atoms (e.g. potassium octoate), and (iii) a tertiary amine (e.g., 2,4,6-tris [dimethylaminomethyl] phenol). This mixture is described in U.S. Pat. No. 4,710,521, whose disclosure is hereby incorporated by reference.

Other additives may also be included in the foam formulations. Included are processing aids, viscosity reducers, such as 1-methyl-2-pyrrolidinone, nonreactive and reactive flame retardants, such as tris(2-chloroethyl)-phosphate, dispersing agents, plasticizers, mold release agents, antioxidants, compatibility agents and fillers and pigments. The use of such additives is well known to those skilled in the art.

The present invention also provides a process for producing a laminate which comprises (a) contacting at least one facing sheet with a foam-forming mixture comprising the quasi-prepolymer, polyol composition, blowing agent, catalyst, and auxiliaries and additives as required (e.g., a surfactant), and (b) foaming the foam-forming mixture. The process is advantageously conducted in a continuous manner by depositing the foam-forming mixture on a facing sheet being conveyed along a production line, and preferably placing another facing sheet on the deposited mixture. The foam-forming mixture is conveniently thermally cured at a temperature from about 20° C. to 150° C. in a suitable apparatus, such as an oven or heated mold.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference.

The invention is further illustrated by the following examples in which all parts and percentages are by weight unless otherwise indicated.

EXAMPLE 1

This example illustrates the preparation of polyisocyanurate foams (18% trimer) separately using a polyisocyanate and a polyisocyanate prepolymer in combination with polyester polyols having different free glycol contents.

In each foam preparation, the quantities of ingredients listed below in Table I were added to a vessel. First, the A-component (a mixture of the isocyanate, blowing agent and surfactant) was blended in the vessel and cooled to 15.6° C. The B-component (polyester polyol) at 25° C. was then added to the vessel, and all ingredients were mixed at 3600 rpm for 10 seconds. The C-component (catalyst) at 25° C. was next mixed into the contents of the vessel over a 2-second interval. All ingredients were thereafter mixed at 3600 rpm for an additional 10 seconds and then poured into a box, yielding a rigid polyisocyanurate foam.

Characteristics of the foams produced (Foams A-D) are shown in Table I. The data shown in the table demonstrate that foams prepared from the quasi-prepolymer (Foams C and D) have lower thermal conductivity measurements than foams prepared from an unmodified isocyanate (Foams A and B). The data also show that the thermal conductivity of foam made from the unmodified isocyanate can be lowered by using a low free glycol-containing polyester polyol (Foam B) in place of a polyester polyol containing a higher free glycol content (Foam A). The optimum thermal conductivity lowering is attained by using the quasi-prepolymer in conjunction with the low free glycol-containing polyester polyol in foam production (Foam D).

TABLE I

PREPARATION OF POLYISOCYANURATE FOAMS

| INGREDIENTS (g) | FOAM A | FOAM B | FOAM C | FOAM D |
|---|---|---|---|---|
| A-Component | | | | |
| Isocyanate[1] | 464.0 | 432.0 | — | — |
| Isocyanate[2] | — | — | 520.4 | 497.4 |
| R-11B | 110.0 | 110.0 | 114.0 | 114.0 |
| Surfactant[3] | 4.0 | 4.0 | 4.0 | 4.0 |
| B-Component | | | | |
| Polyol PS-3152C[4] | 136.0 | — | 79.6 | — |
| Polyol PS-2002[5] | — | 168.0 | — | 102.6 |
| C-Component | | | | |
| Catalyst[6] | 23.4 | 23.0 | 23.2 | 23.1 |
| Reactivity, sec (Cream/Gel/Firm/Tack-free) | 17/26/33/35 | 15/25/29/33 | 16/—/46/50 | 13/37/45/70 |
| Density, lb/ft$^3$ | 1.78 | 1.88 | 1.79 | 1.83 |
| % Closed Cells | 87.6 | 89.1 | 89.5 | 89.7 |
| k-Factor Aging of 1" Thick Core Samples (Btu-in/hr-ft$^2$-°F.) | | | | |
| Initial | .117 | .112 | .117 | .108 |
| 11 days | .133 | .124 | .130 | .118 |
| 29 days | .142 | .129 | .132 | .121 |
| 60 days | .148 | .136 | .140 | .124 |
| 90 days | .152 | .140 | .144 | .128 |
| 120 days | .154 | .143 | .146 | .130 |
| 182 days | .158 | .148 | .152 | .135 |
| 277 days | .162 | .152 | .156 | .140 |
| 364 days | .164 | .156 | .158 | .142 |
| Δk-Factor, 364 days | .047 | .044 | .041 | .034 |

Footnotes:

[1] Isocyanate having an equivalent weight of 138, an acidity of 0.03% HCl, and a viscosity of 2000 cps at 25° C.

[2] Polyester polyol derived quasi-prepolymer having a viscosity of 13,650 cps at 25° C. and a free isocyanate content of 24.8% (BASF Corporation).

[3] Surfactant supplied by the Union Carbide Corporation under the trade name L-5340.

[4] Polyol PS-3152C = reaction product of phthalic anhydride and diethylene glycol (DEG) having a hydroxyl number of 320, a viscosity at 25° C. of 2,500 cps and 15% free DEG (Stepan Company).

[5] Polyol PS-2002 = reaction product of phthalic anhydride and DEG having a hydroxyl number of 200, a viscosity at 25° C. of 9,120 cps and 4% free DEG (Stepan Company).

[6] Catalyst = mixture employed in the form of a solution in DEG in a weight ratio of 1.18 potassium acetate:1.62 potassium octoate:0.69 DMP-30: 6.51 DEG.

EXAMPLE 2

This example illustrates the synthesis of polyisocyanurate foams (10% trimer) using a quasi-prepolymer and a low free glycol-containing polyester polyol.

The foams were prepared according to the procedure of Example 1 from the ingredients and quantities thereof shown in the following Table II. Characteristics of the foams produced are shown in the table. The Table II results show the significant improvement in insulating properties brought about through use of a quasi-prepolymer and a low free glycol-containing polyester polyol, and especially through the combined use of the isocyanate prepolymer and polyester polyol.

TABLE II

PREPARATION OF POLYISOCYANURATE FOAMS

| INGREDIENTS (g) | FOAM A | FOAM B | FOAM C | FOAM D |
|---|---|---|---|---|
| A-Component | | | | |
| Isocyanate[1] | 380.0 | 326.0 | — | — |
| Isocyanate[2] | — | — | 418.0 | 375.2 |
| R-11B | 104.0 | 104.0 | 108.0 | 108.0 |
| Surfactant[3] | 4.0 | 4.0 | 4.0 | 4.0 |
| B-Component | | | | |
| Polyol PS-3152C[4] | 220.0 | — | 181.2 | — |
| Polyol PS-2002[5] | — | 174.0 | — | 224.8 |
| C-Component | | | | |
| Catalyst[6] | 19.4 | 19.6 | 19.5 | 19.4 |
| Reactivity, sec (Cream/Gel/Firm/Tack-free) | 20/33/40/40 | 13/22/28/29 | 19/36/47/50 | 10/24/33/33 |
| Density, lb/ft$^3$ | 1.68 | 1.56 | 1.59 | 1.65 |
| % Closed Cells | 89.1 | 90.8 | 86.3 | 86.1 |
| k-Factor Aging of 1" Thick Core Samples (Btu-in/hr-ft$^2$-°F.) | | | | |

TABLE II-continued

PREPARATION OF POLYISOCYANURATE FOAMS

| INGREDIENTS (g) | FOAM | | | |
|---|---|---|---|---|
| | A | B | C | D |
| Initial | .130 | .114 | .127 | .112 |
| 11 days | .138 | .124 | .135 | .116 |
| 29 days | .146 | .128 | .142 | .120 |
| 60 days | .152 | .134 | .148 | .122 |
| 95 days | .153 | .138 | .152 | .124 |
| 120 days | .159 | .142 | .152 | .128 |
| 180 days | .160 | .145 | .158 | .134 |
| 270 days | .165 | .150 | .160 | .136 |
| 364 days | .167 | .152 | .163 | .138 |
| Δk-Factor, 364 days | .037 | .038 | .036 | .026 |

[1] Of Example 1.
[2] Of Example 1.
[3] Of Example 1.
[4] Of Example 1.
[5] Of Example 1.
[6] Of Example 1.

EXAMPLE 3

This example illustrates the preparation of a quasi-prepolymer and its use in combination with polyester polyols having different free glycol contents in the production of polyisocyanurate foam (10% trimer).

A. Preparation of Quasi-Prepolymer

A dry reaction vessel equipped with an agitator, thermometer, addition funnel and inlet for nitrogen gas was charged with 90.1 parts of a polyisocyanate[1]. The isocyanate was agitated under a nitrogen blanket throughout the preparation. The polyisocyanate in the vessel was heated to 90°±2° C. 9.9 parts of a polyester polyol[2] were added at a constant rate over a period of 90 to 120 minutes maintaining the temperature at 90°±2° C. After the polyol addition was completed, the reaction was continued at 90°±2° C. for an additional 90 minutes. The quasi-prepolymer produced had a viscosity of 13,750 cps at 25° C. and a free isocyanate content of 26.39%.

1. Isocyanate having an equivalent weight of 133 and a viscosity of 180–200 cps at 25° C.
2. Polyol=reaction product of phthalic anhydride and ethylene glycol having a hydroxyl number of 300 and a viscosity at 25° C. of 31,600 cps.

B. Preparation of Polyisocyanurate Foams

The foam syntheses were conducted according to the procedure of Example 1 utilizing the ingredients and quantities thereof presented in Table III below. Characteristics of the foams produced (Foams A–C) are shown in the table. The data show that the combined use of the quasi-prepolymer and low free glycol-containing polyester polyol results in a lower thermal conductivity than use of the quasi-prepolymer with a polyester polyol having a higher glycol content.

TABLE III

PREPARATION OF POLYISOCYANURATE FOAMS

| INGREDIENTS (pts. by wt.) | FOAM | | |
|---|---|---|---|
| | A | B | C |
| A-Component | | | |
| Isocyanate[1] | 253 | — | — |
| Isocyanate[2] | — | 269 | 242 |
| R-11B | 65.0 | 56.8 | 62.4 |
| Surfactant[3] | 2.67 | 2.67 | 2.67 |
| B-Component | | | |
| Polyol PS-3152C[4] | 147 | 131 | — |
| Polyol PS-2002[5] | — | — | 158 |
| C-Component | | | |
| Catalyst[6] | 13.3 | 13.3 | 13.3 |
| Density, lb/ft³ | 1.64 | 1.68 | 1.72 |
| k-Factor Aging of 1" Thick Core Samples (Btu-in/hr-ft²-°F.) | | | |
| Initial | .128 | .118 | .106 |
| 10 days | .137 | .122 | .112 |
| 30 days | .144 | .128 | .114 |
| 60 days | .150 | .136 | .118 |
| 90 days | .154 | .140 | .122 |

[1] Of Example 1.
[2] Quasi-prepolymer of Example 3A.
[3] Of Example 1.
[4] Of Example 1.
[5] Of Example 1.
[6] Of Example 1.

EXAMPLE 4

This example illustrates the synthesis of further polyisocyanurate foams (18% trimer) utilizing a quasi-prepolymer in combination with polyester polyols having different free glycol contents.

The foams were prepared according to the procedure of Example 1 utilizing the ingredients and quantities thereof presented in Table IV below. The data in the table again reveal the improved insulating properties resulting from use of a quasi-prepolymer in combination with a low free glycol-containing polyester polyol in foam production.

TABLE IV

PREPARATION OF POLYISOCYANURATE FOAMS

| INGREDIENTS (pts. by wt.) | FOAM | | |
|---|---|---|---|
| | A | B | C |
| A-Component | | | |
| Isocyanate[1] | 309 | — | — |
| Isocyanate[2] | — | 331 | 319 |
| R-11B | 73.0 | 59.2 | 65.4 |
| Surfactant[3] | 2.67 | 2.67 | 2.67 |
| B-Component | | | |
| Polyol PS-3152C[4] | 91 | 69 | — |
| Polyol PS-2002[5] | — | — | 81 |
| C-Component | | | |
| Catalyst[6] | 13.3 | 13.3 | 13.3 |
| Density, lb/ft³ | 1.72 | 1.77 | — |
| k-Factor Aging of | | | |

TABLE IV-continued

| PREPARATION OF POLYISOCYANURATE FOAMS | | | |
|---|---|---|---|
| INGREDIENTS | FOAM | | |
| (pts. by wt.) | A | B | C |
| 1" Thick Core Samples (Btu-in/hr-ft²-°F.) | | | |
| Initial | .122 | .125 | .112 |
| 10 days | .133 | .130 | .117 |
| 30 days | .141 | .132 | .122 |
| 60 days | .147 | .140 | .130 |
| 90 days | .154 | .150 | .132 |

¹Of Example 1.
²Quasi-prepolymer of Example 3A.
³Of Example 1.
⁴Of Example 1.
⁵Of Example 1.
⁶Of Example 1.

We claim:

1. A polyisocyanurate foam comprising the reaction product in the presence of a blowing agent and catalyst of
   (a) an isocyanate group-terminated quasi-prepolymer prepared by reacting an organic polyisocyanate with an organic compound having at least two active hydrogen atoms, and
   (b) a minor amount of a polyol component, wherein the polyol component comprises
       (i) a polyester polyol having a free glycol content of less than about 7 percent by weight of the polyester polyol or
       (ii) a mixture of the low free glycol-containing polyester polyol with at least one other polyol, the total free glycol content of mixture (b) being less than about 7 percent by weight of the polyester polyol.

2. The polyisocyanurate foam of claim 1 wherein quasi-prepolymer (a) is the reaction product of the organic polyisocyanate and an aromatic polyester polyol, and polyol component (b) is an aromatic polyester polyol.

3. The polyisocyanurate foam of claim 2 wherein the organic polyisocyanate is selected from the group consisting of toluene diisocyanate, diphenylmethane diisocyanate, and polymeric MDI, and mixtures thereof.

4. The polyisocyanurate foam of claim 3 wherein the organic polyisocyanate is polymeric MDI.

5. The polyisocyanurate foam of claim 2 wherein quasi-prepolymer (a) is the reaction product of
   (a) the organic polyisocyanate and
   (b) an aromatic polyester polyol comprising the reaction product of
       (i) at least one member selected from the group consisting of (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, and (h) trimellitic anhydride, and
       (ii) at least one low molecular weight aliphatic polyhydric alcohol.

6. The polyisocyanurate foam of claim 5 wherein quasi-prepolymer (a) is reacted with an aromatic polyester polyol comprising the reaction product of at least one member selected from the group consisting of (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, and (h) trimellitic anhydride, and at least one glycol or a mixture of polyols containing at least one glycol.

7. The polyisocyanurate foam of claim 6 wherein quasi-prepolymer (a) is the reaction product of
   (a) an organic polyisocyanate selected from the group consisting of toluene diisocyanate, diphenylmethane diisocyanate, and polymeric MDI, and mixtures thereof, and
   (b) an aromatic polyester polyol comprising the reaction product of
       (i) phthalic anhydride and
       (ii) at least one low molecular weight aliphatic polyhydric alcohol,
the aromatic polyester polyol being utilized in an amount of from 2 to 30 percent by weight relative to the total quasi-prepolymer weight.

8. The polyisocyanurate foam of claim 5 wherein quasi-prepolymer (a) is reacted with an aromatic polyester polyol comprising the reaction product of a polycarboxylic acid component selected from the group consisting of a polycarboxylic acid, a polycarboxylic acid derivative and mixtures thereof, and an aliphatic diol of the generic formula:

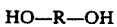

wherein R is a divalent radical selected from the group consisting of:
   (a) alkylene radicals each containing from 2 through 6 carbon atoms, and
   (b) radicals of the formula:

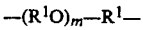

wherein $R^1$ is an alkylene radical containing from 2 through 6 carbon atoms, and m is an integer of from 1 through 4, and
   (c) mixtures thereof.

9. The polyisocyanurate foam of claim 8 wherein quasi-prepolymer (a) is the reaction product of
   (a) an organic polyisocyanate selected from the group consisting of toluene diisocyanate, diphenylmethane diisocyanate, and polymeric MDI, and mixtures thereof, and
   (b) an aromatic polyester polyol comprising the reaction product of
       (i) phthalic anhydride and
       (ii) at least one low molecular weight aliphatic polyhydric alcohol,
the aromatic polyester polyol being utilized in an amount of from 2 to 30 percent by weight relative to the total quasi-prepolymer weight.

10. The polyisocyanurate foam of claim 9 wherein quasi-prepolymer (a) is reacted with an aromatic polyester polyol having a free glycol content of less than about 5 percent by weight of the aromatic polyester polyol.

11. The polyisocyanurate foam of claim 5 wherein quasi-prepolymer (a) is reacted with an aromatic polyester polyol comprising the reaction product of a polycarboxylic acid component selected from the group consisting of a polycarboxylic acid, a polycarboxylic acid derivative, and mixtures thereof, and an alkylene glycol having the formula

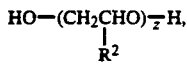

wherein $R^2$ is hydrogen or lower alkyl of one to four carbon atoms and z is from 1 to 5.

12. The polyisocyanurate foam of claim 11 wherein quasi-prepolymer (a) is the reaction product of
   (a) an organic polyisocyanate selected from the group consisting of toluene diisocyanate, diphenylmethane diisocyanate, and polymeric MDI, and mixtures thereof, and
   (b) an aromatic polyester polyol comprising the reaction product of
      (i) phthalic anhydride and
      (ii) at least one low molecular weight aliphatic polyhydric alcohol,
   the aromatic polyester polyol being utilized in an amount of from 2 to 30 percent by weight relative to the total quasi-prepolymer weight.

13. The polyisocyanurate foam of claim 12 wherein quasi-prepolymer (a) is reacted with an aromatic polyester polyol derived from an alkylene glycol selected from the group consisting of ethylene glycol, diethylene glycol, and mixtures thereof.

14. The polyisocyanurate foam of claim 13 wherein quasi-prepolymer (a) is reacted with an aromatic polyester polyol having a free glycol content of less than about 5 percent by weight of the aromatic polyester polyol.

15. The polyisocyanurate foam of claim 11 wherein quasi-prepolymer (a) is reacted with an aromatic polyester polyol comprising the reaction product of a polycarboxylic acid component selected from the group consisting of phthalic anhydride, phthalic acid, and mixtures thereof, and a glycol selected from the group consisting of ethylene glycol, diethylene glycol, and mixtures thereof.

16. The polyisocyanurate foam of claim 15 wherein quasi-prepolymer (a) is the reaction product of
   (a) an organic polyisocyanate selected from the group consisting of toluene diisocyanate, diphenylmethane diisocyanate, and polymeric MDI, and mixtures thereof, and
   (b) an aromatic polyester polyol comprising the reaction product of
      (i) phthalic anhydride and
      (ii) at least one low molecular weight aliphatic polyhydric alcohol, the aromatic polyester polyol being utilized in an amount of from 2 to 30 percent by weight relative to the total quasi-prepolymer weight.

17. The polyisocyanurate foam of claim 16 wherein quasi-prepolymer (a) is reacted with an aromatic polyester polyol having a free glycol content of less than about 5 percent by weight of the aromatic polyester polyol.

18. The polyisocyanurate foam of claim 11 wherein quasi-prepolymer (a) is reacted with an aromatic polyester polyol characterized by a viscosity in cps at 25° C. of about 8,000 to 35,000, a free glycol content of from about 0 through 5 percent by weight of the polyester polyol, and a hydroxyl number within the range of from about 190 to 240.

19. The polyisocyanurate foam of claim 18 wherein quasi-prepolymer (a) is the reaction product of
   (a) an organic polyisocyanate selected from the group consisting of toluene diisocyanate, diphenylmethane diisocyanate, and polymeric MDI, and mixtures thereof, and
   (b) an aromatic polyester polyol comprising the reaction product of
      (i) phthalic anhydride and
      (ii) at least one low molecular weight aliphatic polyhydric alcohol,
   the aromatic polyester polyol being utilized in an amount of from 2 to 30 percent by weight relative to the total quasi-prepolymer weight.

20. The polyisocyanurate foam of claim 19 wherein quasi-prepolymer (a) is reacted with an aromatic polyester polyol comprising the reaction product of phthalic anhydride and a glycol selected from the group consisting of ethylene glycol, diethylene glycol, and mixtures thereof.

21. The polyisocyanurate foam of claim 1 wherein the blowing agent is a member selected from the group consisting of water, air, nitrogen, carbon dioxide, readily volatile organic substances, compounds which decompose to liberate gases, and mixtures thereof.

22. The polyisocyanurate foam of claim 1 wherein the blowing agent is a member selected from the group consisting of chlorinated and fluorinated hydrocarbons, mixtures of said hydrocarbons, and mixtures of said hydrocarbons with water.

23. The polyisocyanurate foam of claim 1 which includes at least one additive selected from the group consisting of viscosity reducers, flame retardants, dispersing agents, plasticizers, mold release agents, antioxidants, compatibility agents, fillers and pigments.

24. A laminate comprising at least one facing sheet adhered to the polyisocyanurate foam of claim 1.

25. A laminate comprising at least one facing sheet adhered to the polyisocyanurate foam of claim 6.

26. A laminate comprising at least one facing sheet adhered to the polyisocyanurate foam of claim 8.

27. A laminate comprising at least one facing sheet adhered to the polyisocyanurate foam of claim 9.

28. A laminate comprising at least one facing sheet adhered to the polyisocyanurate foam of claim 13.

29. A laminate comprising at least one facing sheet adhered to the polyisocyanurate foam of claim 15.

30. A laminate comprising at least one facing sheet adhered to the polyisocyanurate foam of claim 20.

31. A polyurethane foam comprising the reaction product in the presence of a blowing agent and a catalyst of
   (a) an isocyanate group-terminated quasi-prepolymer prepared by reacting an organic polyisocyanate with an organic compound having at least two active hydrogen atoms, and
   (b) a polyol component which comprises a polyol mixture containing a polyester polyol having a free glycol content of less than about 7 percent by weight of the polyester polyol, the amount of the low free glycol-containing polyester polyol in the polyol mixture being sufficient to reduce the aged k-factor of the resultant foam to below the aged k-factor of the corresponding foam prepared from the same foam-forming composition and having the same index except that the polyol component does not include the low free glycol-containing polyester polyol.

32. A laminate comprising at least one facing sheet adhered to the polyurethane foam of claim 31.

* * * * *